March 26, 1935. A. O. HURXTHAL 1,996,020
APPARATUS FOR HANDLING, DRYING, AND PROCESSING MATERIALS
Filed Feb. 11, 1932 5 Sheets-Sheet 3

Fig. 6.

Inventor:
Alpheus O. Hurxthal
by his Attorneys
Howson & Howson

March 26, 1935.  A. O. HURXTHAL  1,996,020
APPARATUS FOR HANDLING, DRYING, AND PROCESSING MATERIALS
Filed Feb. 11, 1932  5 Sheets-Sheet 4

Inventor:
Alpheus O. Hurxthal
by his Attorneys
Howson & Howson

Inventor:
Alpheus O. Hurxthal
by his Attorneys
Howson & Howson

Patented Mar. 26, 1935

1,996,020

UNITED STATES PATENT OFFICE 1,996,020

APPARATUS FOR HANDLING, DRYING AND PROCESSING MATERIALS

Alpheus O. Hurxthal, Philadelphia, Pa., assignor to Proctor & Schwartz, Incorporated, Philadelphia, Pa., a corporation of Pennsylvania Application February 11, 1932, Serial No. 592,397

12 Claims. (Cl. 34—48)

This invention relates to an apparatus for the handling, drying and processing of various kinds of materials in sheet, web, or strip form, and more particularly to the conveying of such materials through a drying apparatus when the material has been coated, printed, or otherwise treated on one face, which prohibits the contacting of the treated surface with guides, rollers, or other objects in passing through the apparatus before the treated surface is so dried, or otherwise conditioned, that the material may be handled without injury to the treated surface.

The object of the present invention is to provide a compact form of drier, or other processing apparatus having means for passing the material through the apparatus in a more or less circuitous path, and to provide differential pneumatic pressures at the opposite faces of the conveying means respectively, for holding the material on the conveying means and for effectively transferring the material from one conveyer to another without the aid of guides, rollers or other mechanical equipment that would make contact with the treated surface of the material as it is being carried along its circuitous path in the apparatus.

Other objects of the invention, the construction and operation of the apparatus will be fully disclosed hereinafter, reference being had to the accompanying drawings, of which.

Referring to Figs. 1 to 5 of the drawings, the processing apparatus, in the present instance a drier, comprises an outer casing 1, composed of end walls 2 and 3 respectively, side walls 4 and 5 respectively, a roof 6, and a floor 7.

Figure 1:
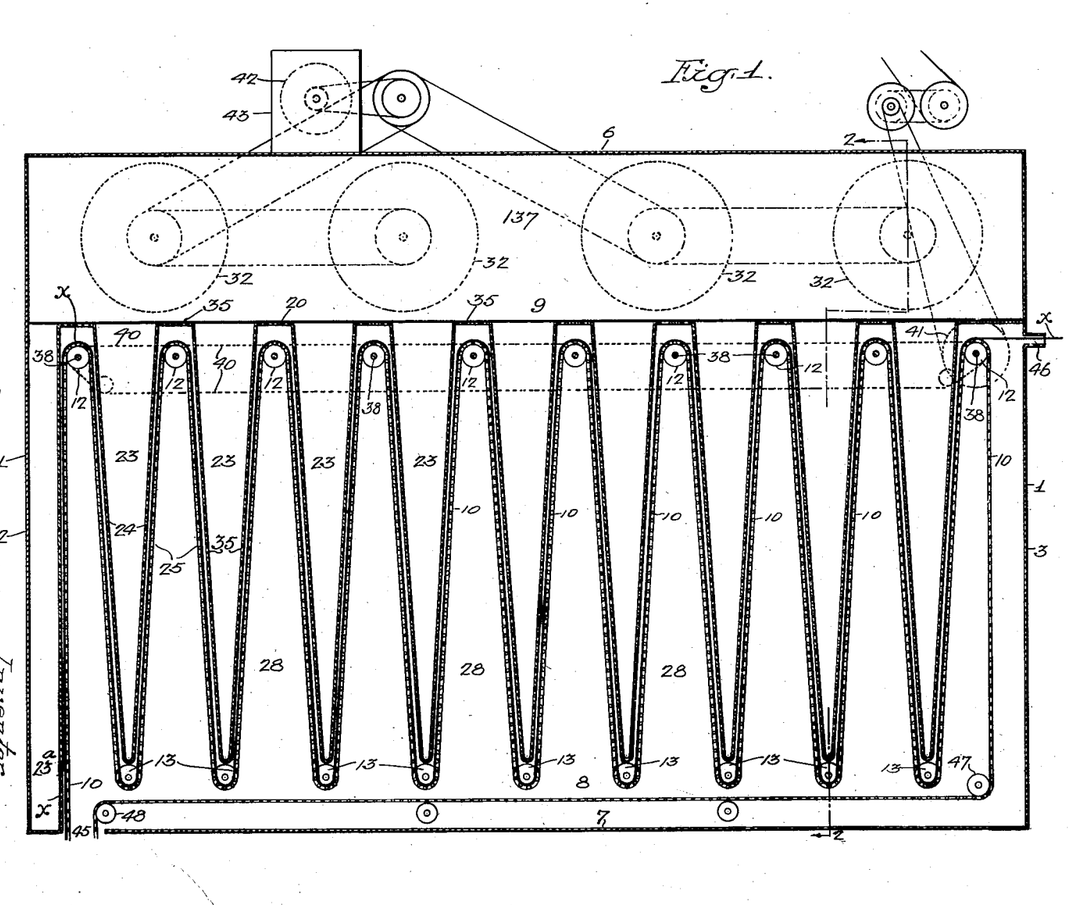
Fig. 1 is a longitudinal sectional elevation of a drying apparatus made in accordance with the principles of the present invention.

Extending longitudinally through the casing 1 is a conveyer belt 10, which is arranged in a series of undulations, constituting a circuitous path through which the conveyer belt 10 passes, which for all intents and purposes divides the interior of the casing 1 into an upper chamber 9 and a lower chamber 8.

The conveyer belt 10 in the present instance comprises a pair of laterally spaced side chains 11, 11 which pass over a series of upper sprockets or rolls 12, 12 and around and under a series of guide sprockets or other wheels 13, 13 disposed adjacent the floor 7 of the drier.

Supported by and disposed intermediate the side chains 11, 11 is the body or carrying portion 14 of the conveyer belt which may be of any flat flexible material of a solid or perforated nature suitable for supporting the material to be conveyed thereby and in the preferred form consisting of a series of rods 15, 15 extending substantially parallel to each other transversely of the belt 10 intermediate the side chains 11, 11 thereof and secured at their opposite ends to the said side chains respectively.

The material to be treated within the casing 1 is disposed against one face of the body portion 14 of the belt 10 and follows the belt 10 through the said casing 1. The primary object of the present invention is to hold this material, illustrated at $x$, to the carrying face of the conveyer 10, without the use of clamps, guides or other mechanical means contacting with the exposed face of the material $x$ which lies opposite to the face engaged by the belt 10. For this purpose a pneumatic pressure, preferably exceeding atmospheric pressure, is maintained in the upper chamber 9, while the pressure in the chamber 8 is equal to one atmosphere or less, thereby creating a pressure differential on opposite sides of the conveyer belt, which securely holds the material $x$ to the carrying face of the belt 10 as the said belt travels through the undulations or other circuitous path in the casing 1.

Figure 9:
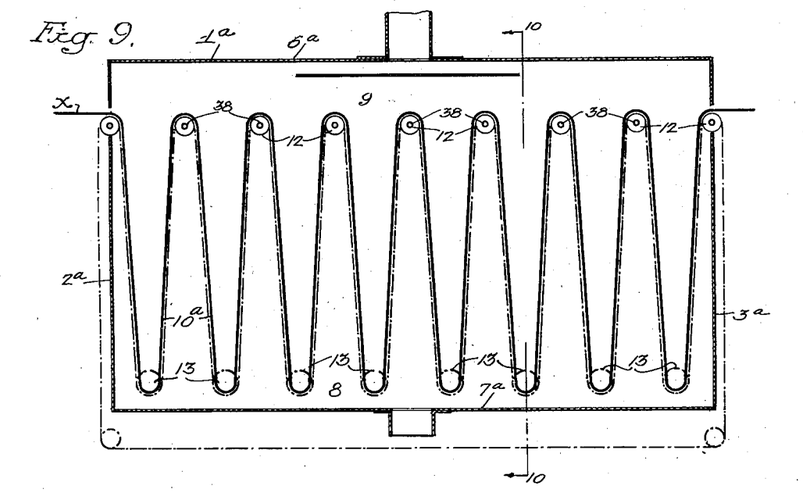
Figs. 9 and 10 are diagrammatic longitudinal and transverse sectional elevations, respectively, of a casing constructed within the scope of the present invention, Fig 10 being taken on the line 0—10, Fig. 9.
Figure 10:
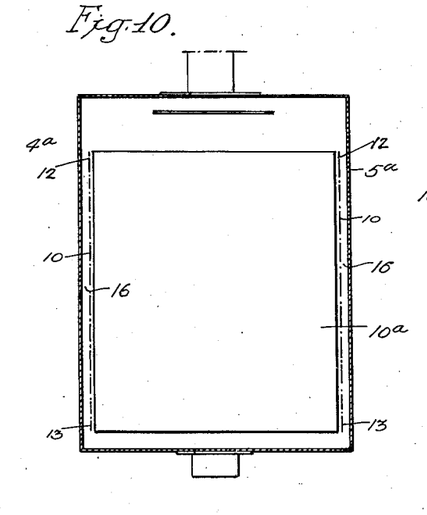

This fundamental principle may be more readily understood upon reference to Figs. 9 and 10, wherein the belt 10a for the purpose of illustration, extends practically across the entire width of the casing 1a from the side wall 4a to the side wall 5a, leaving but relatively narrow spaces 16, 16 between the edges 17, 17 of the conveyer 10a, which for the purpose of illustration may be of a solid imperforate nature, and the side walls 4a and 5a respectively.

Obviously, air or other gaseous fluid of a pressure above atmospheric pressure in the high pressure chamber 9 in attempting to pass to the low pressure chamber 8 will exert pressure against the carrying surface of the belt 10a and will pass around the edges 17, 17 of the belt through the passages 16, 16, into the lower pressure chamber 8, thereby holding the material x flatly against the carrying surface of the belt 10a throughout each and every part of the circuitous path traveled by the conveyer 10a.

Obviously, if the conveyer 10a is of a foraminous nature the tendency of the gaseous fluid in the higher pressure chamber 9 would be to pass directly through the perforations in the belt to the lower pressure chamber 8, thereby holding any material, such as individual sheets, or strips, that may be disposed on the carrying surface of the belt 10a rigidly thereto, by reason of the differential pressures at the opposite faces of the belt 10 along its entire path of movement to the casing 1.

Figures 2, 3, 4, 5:
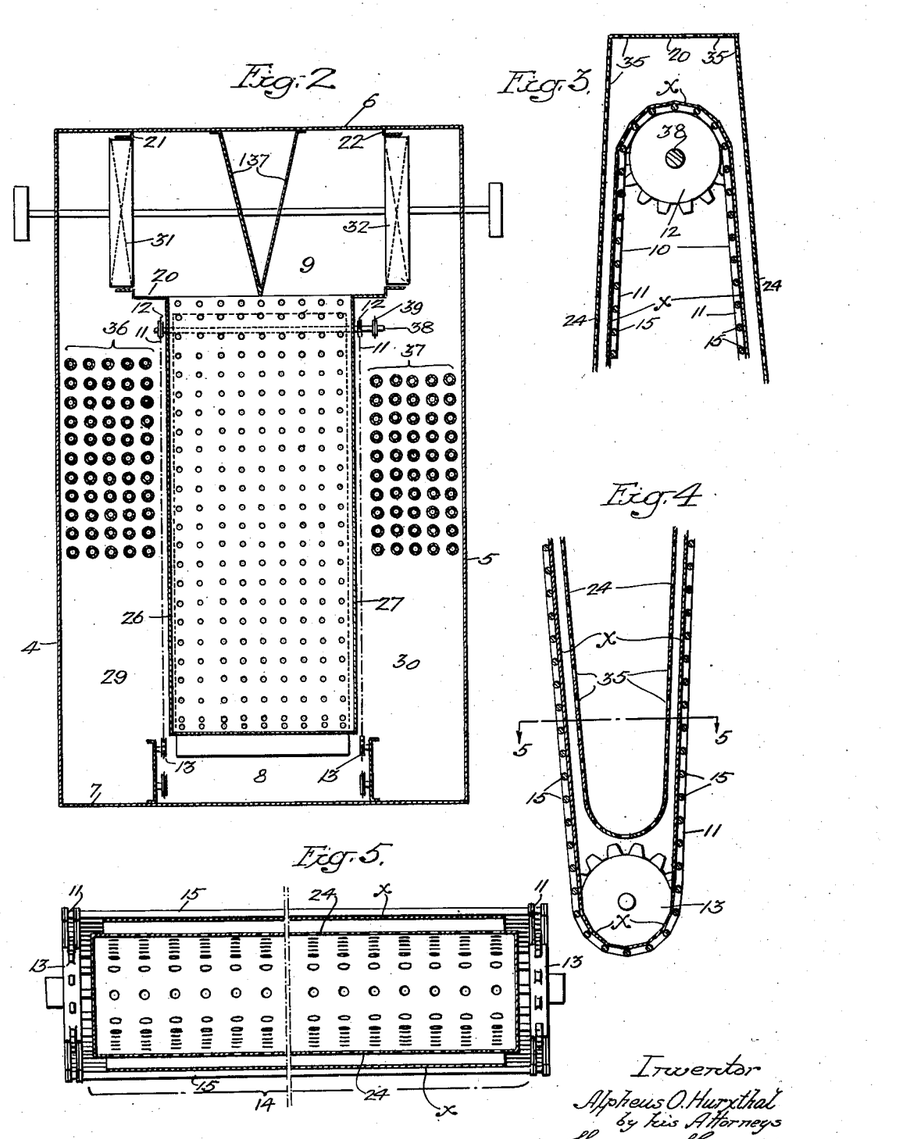
Fig. 2 is a transverse sectional elevation taken on the line 2—2, Fig. 1.
Figs. 3 and 4 are respectively enlarged sectional views of fragmentary portions of the apparatus illustrated in Fig. 1 and illustrating the manner in which the material is conveyed through the apparatus.
Fig. 5 is a sectional plan view taken on the line 5—5, Fig. 4.

In the preferred form of the invention illustrated in Figs. 1 and 2 of the drawings, the high pressure chamber 9 comprises a horizontal partition 20, spaced from the top wall 6 of the casing 1, and side walls 21 and 22 extending substantially parallel to and spaced inwardly from the side walls 4 and 5 respectively of the casing 1.

Depending from the horizontal partition 20 of the upper chamber 9 and projecting into the spaces between the undulations of the belt 10 are extensions 23, 23 of the upper chamber 9, each of which comprises a pair of converging walls 24, 24 which are respectively disposed in substantially parallel spaced relation to the similarly converging runs 25, 25 of the belt 10, each of the extensions 23 being closed at its opposite sides by side walls 26 and 27 which are disposed substantially parallel to the side walls 4 and 5 respectively, of the casing 1. This construction provides upwardly projecting extensions 28 of the lower chamber 8 intermediate the downwardly extending projections 23 of the upper chamber 9. The upwardly projecting extensions 28 of the lower chamber 8 communicate at their opposite sides respectively with side chambers 29 and 30 respectively. In the present instance, the side chambers 29 and 30 extend from the floor 7 to the roof 6 and provide return communication between the lower chamber 8 and the upper chamber 9.

Within openings formed in the side walls 21 and 22 of the upper chamber 9 are circulating fans 31 and 32 respectively, which, when rotated at a proper speed, draw the air from the communicating chambers 29 and 30, and hence from the lower chamber 8 and the extensions 28 thereof, thereby reducing the pressure therein below atmospheric pressure. The air is driven into the upper chamber 9 and its depending extensions 23, by the fans 31 and 32, thereby increasing the pressure in the said upper chamber 9 and its extensions 23 above atmospheric pressure.

By the above noted movement of the air within the casing 1, differential pressures are created at the opposite faces of the carrying belt 10, the higher pressure escaping from the chamber 9 and its extensions 23 through perforations 35 formed in the lower wall 20 of the chamber 9 and in the transversely extending walls 24 of the extension 23 thereof and impinging upon the carrying surface of the conveyer 10, disposed adjacent to the said perforated walls, whereby the material x on the supporting surface of the conveyer 10 is forced into contact with and thereby securely held on and to the said carrying surface of the belt 10.

The air after impinging upon the carrying surface of the belt 10, or the exposed treated surface of the material x supported by the belt 10, and particularly when the material x is of a web form and covers practically the entire surface of the conveyer 10, between the side chains 11, 11 thereof, passes over the said surface of the material toward the opposite longitudinal edges thereof, creating a circulation which tends to dry the coating or other treatment applied to the exposed surface of the material x, the air passing off the material x and the belt 10 at the side edges thereof into the communicating chambers 29 and 30 respectively. In cases where sheet or strip materials are disposed on the foraminous belt 10 the air passes around the edges of the independent pieces of material and through the belt into the extensions 28 of the lower chamber 8.

In any event differential pressures are created and maintained at the opposite faces of the conveyer and the material carried on one face thereof which causes the material to be held firmly on the conveyer. Furthermore, a circulation is created in a direction toward and impinging upon the treated surface of the material x and the uncovered portions of the carrying surface of the conveyer belt 10 and in a direction away from the reverse face of the material x and the belt 10 which in addition to firmly holding the material on the belt causes the treated surface of the material to be dried.

For the purpose of drying the material, any desirable form of means may be provided for heating the air in circulation, such for example as the heating coils 36 and 37 disposed in the circulating chambers 29 and 30 respectively.

In order to assure an even circulation, throughout the entire apparatus, the upper chamber 9 is provided with a longitudinal baffle 137, in the present instance of a V-shaped nature which is disposed at the center of the chamber 9 and extends the full length of the casing 1 and from the top wall 6 thereof to the bottom wall 20 of the upper chamber 9, whereby the air driven into the chamber 9 is deflected downwardly into the extensions 23 thereof, whereby a substantially uniform pressure and volume of air is maintained in the chamber 9 and all of the depending extensions 23 thereof.

The sprockets 12 are respectively secured to transversely extending shafts 38, on one end of each of which is a sprocket 39 (see Fig. 2). The teeth of the several sprockets 39 are engaged by a chain 40, for effecting rotation of all the sprockets 12 in unison and at the same speed. The shaft 38 adjacent the end 3 of the casing, in the present instance, extends beyond the side wall 5 and is provided, outside the casing 1, with a sprocket or other drive wheel 41 by which power may be supplied to the series of shafts 38 through the chain 40 from any suitable source of power.

All of the fans 31 and 32 are substantially of the same pitch and capacity, and are driven at substantially the same speeds, from any suitable source of power, in order to maintain uniform pressure in the upper chamber 9.

If desired, an additional fan 42 may be provided in a dome 43 on the casing 1, to inject a predetermined amount of fresh air into the casing 1, or to withdraw a predetermined amount of moist air from the casing, or the fan may be alternately operated in opposite directions, first in one direction to withdraw air from the casing and then in the opposite direction to force fresh air into the casing 1.

Figure 7:
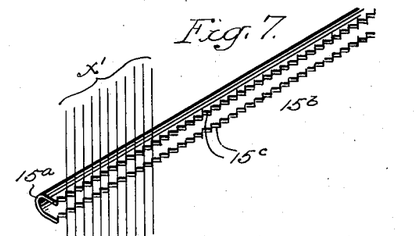
Figs. 7 and 8 are fragmentary views illustrating further modified details of the invention.

In some instances, it may be desirable to provide a roughened surface on the carrying face of the conveyer 10 to firmly grip certain kinds of material in which case the rods of the body portion of the conveyer belt may be made of a U-shape cross section, as illustrated at 15a in Fig. 7, and the edges 15b of the U-shaped rods provided with serrations 15c. Such serrations may also serve another purpose, that is, they may form spacing supports for a series of threads, cords or other filaments $x^1$, which may be disposed in the grooves of the cross bars 15a to be carried in continuous laterally spaced lines through the casing 1, the rushing of the air pressure from the chamber 9 to the chamber 8 in passing the threads $x^1$ as they are supported by the rods 15a, causing the filaments to be maintained in their spacing grooves 15c respectively.

Figure 8:
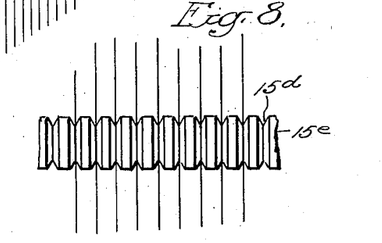

As shown in Fig. 8, the rods may be circular in form as illustrated at 15e and provided with a series of annular laterally spaced grooves 15d.

In the instance shown in Fig. 1, the conveyer belt 10 with the material $x$ on one face thereof enters the casing 1 through an opening 45 formed in the floor 7 adjacent the end wall 2 of the casing 1. The material $x$ after passing through the circuitous path of and with the belt 10 is separated from the conveyer belt 10 as the said belt passes around the sprockets 12, 12 immediately adjacent the discharge end 3 of the casing, the material $x$ passing out of the casing 1 through an opening 46 formed in the end wall 3 thereof, while the belt 10 passes downwardly within the casing and around sprockets or rollers 47, thence through the lower chamber 8 and around sprockets or rollers 48 adjacent the opening 45 in the floor 7, thence out of the casing through the said opening 45.

The conveyer belt 10 in the present instance is passed out of the drier casing for the purpose of receiving the material $x$ directly from the coating, printing, or treating machine or apparatus remotely disposed with respect to the casing 1, to be led back into the casing through the opening 45 with the treated material on the carrying face thereof, but in some instances the conveyer belt 10, instead of passing out through the opening 45, may pass around another sprocket at the receiving end of the casing and thence through the series of undulations in a continuous operation within the casing 1, and the material $x$ may enter the casing 1 and be immediately forced into contact with the carrying face of the conveyer belt 10 by the air rushing from the end extension 23a of the upper chamber 9 directly into the lower chamber 8.

Figure 6:
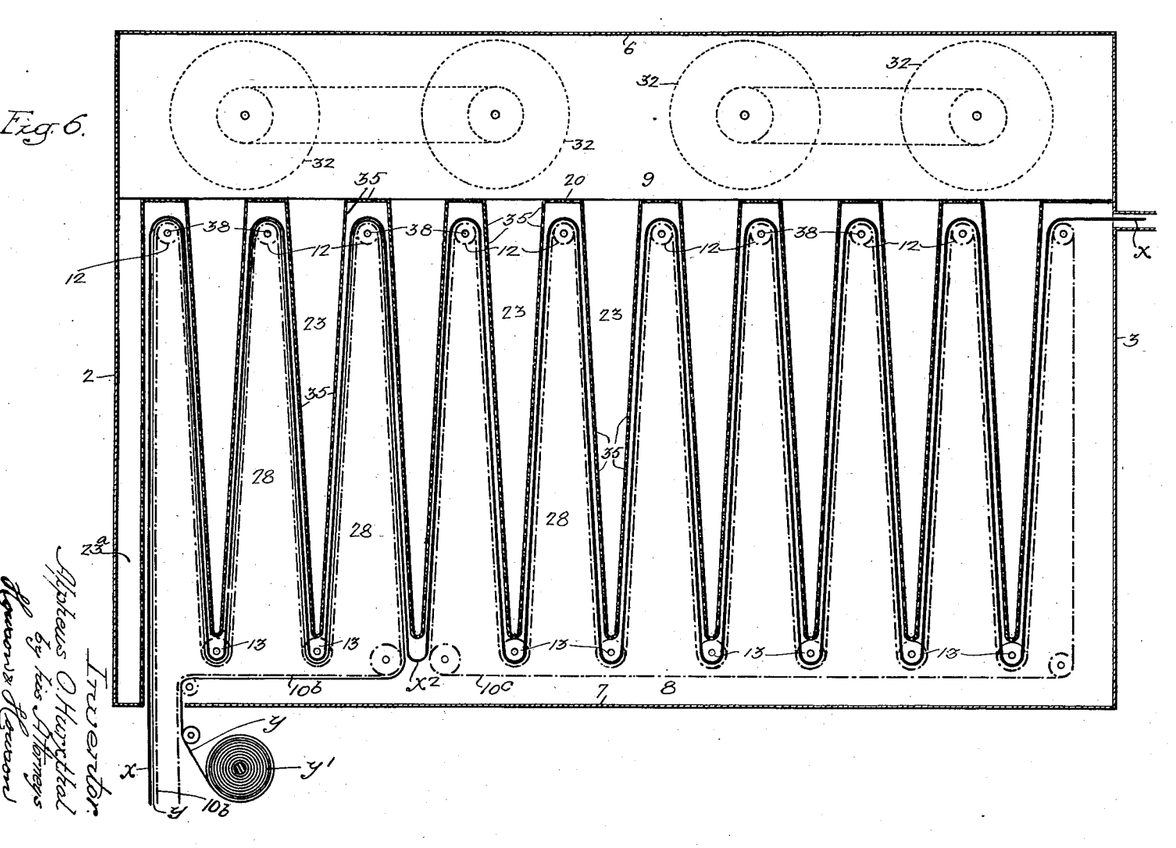
Fig. 6 is a view similar to Fig. 1, and illustrating a modified form of the invention.

In the printing of textile fabrics a backing cloth is sometimes employed and this backing cloth is carried through the drying operation for a predetermined period thereof, then being removed and the printed fabric passing through the remaining portion of the drying operation alone. In such cases with an apparatus constructed according to the principles of the present invention, the material $x$ and the backing cloth $y$, are carried on a conveying belt 10b which passes into the casing in the same manner as noted above and after passing through the relatively small number of the undulations passes out of the casing, carrying with it the backing cloth $y$ which is rolled as at $y^1$ for subsequent use, the material $x$ leaving the backing cloth at a point intermediate a pair of the undulations, as illustrated at $x^2$, and passing on to the carrying surface of a separate conveying belt 10c, as illustrated in Fig. 6, this conveying belt 10c being confined to movement entirely within the casing 1 in the manner above referred to.

One advantage attending the use of the carrying belt consisting of the longitudinal side chains and the transversely extending laterally spaced bars constituting the carrying portion or body of the belt is the ease with which the web, strip or sheet materials may be fed through the undulations of the belt, i. e. the leading edge of each piece of material may be readily attached, as by any desired form of clip, to one of the cross bars and thereby lead the said edge of the piece into and through the casing, the air pressure, after the leading edge of the piece has entered the casing, thereafter firmly holding the entire piece to the belt.

Figure 11:
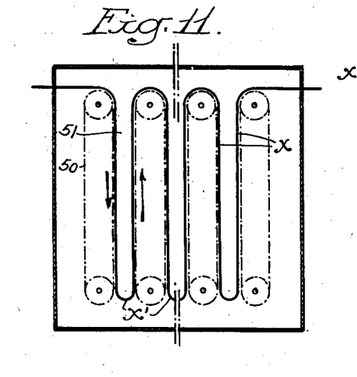
Figs. 11 and 12 respectively illustrate modifications within the scope of the present invention.
Figure 12:
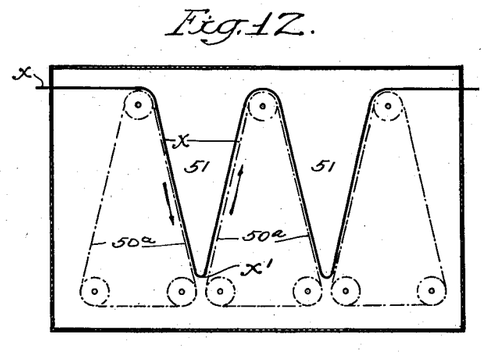

In some instances in place of the single belt 10, or pair of belts 10a, 10b, the material $x$ may be carried and advanced in and through a circuitous path by a series of individual conveyers 50, 50 arranged adjacent and substantially parallel to each other as shown in Fig. 11, or each of the individual conveyers 50a may be arranged in triangular form as shown in Fig. 12 and arranged with the adjacent runs of adjacent conveyers converging.

In either case, the material $x$ passes down, on and with the down run of one conveyer unit and up, on and with the up run of the next adjacent conveyer unit, the material being held to such carrying runs by a relatively high pneumatic pressure in the spaces 51 intermediate the said carrying runs of the said adjacently disposed conveyer units. All the conveying units preferably travel at the same lineal speed.

The pressure in the spaces 51 acts in and against the looped portions $x^1$ of the material $x$ at the lower ends of the spaces 51, where the material passes off the down run of one conveyer onto the up run of the next conveyer, thereby effecting the transfer of the material from one conveyer to the other without the aid of any rollers or other guides of any kind contacting with the surface of the material exposed to the pressure in the spaces 51.

In the instances of Figs. 11 and 12, and in the other instances disclosed in this application, the loops $x^1$ may be produced at any place along the adjacently disposed converging or parallel down and up runs of the conveyers or similar runs of adjacent undulations of the continuous conveyer, and the material will leave the down run of the one and transfer to the up run of the other and be held securely to the said runs immediately before and after the transfer is made, solely by the pressure in and against the loop $x^1$. Such is the case when the material shrinks or stretches during the process thereof, whereby the loops $x^1$ move up or down in the spaces 51, as the case may be.

Figure 13:
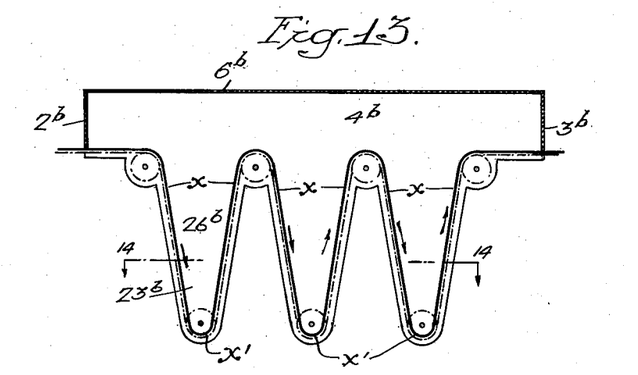
Figs. 13 and 14 illustrate a further modification of the apparatus.
Figure 14:
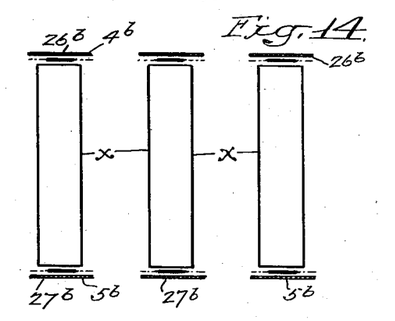

Figs. 13 and 14 disclose an apparatus which consists of a pressure casing 20b having end, side and top walls 2b, 3b, 4b, 5b and 6b respectively, the said side walls having depending tongues 26b and 27b forming side walls for depending extension chambers 23b. The bottom of the casing 20b and its depending extensions 23b is substantially closed by the conveyer belt 10d which carries the material x on the face of the belt within the pressure casing formed by said end, side and top walls. Obviously, the pressure in said casing holds the material to the belt 10d as it passes in an undulated path along the bottom of the casing.

Ordinarily when material is carried by a conveyer belt through and along a circuitous path it and the conveyor belt passes around and over rollers at the tops of the undulations and around and under other rollers at the bottoms of the undulations respectively. With the use of differential pressures at the opposite faces of the conveyer and the material carried thereby the use of the rollers in the bases of the undulations is eliminated and no other form of guide is necessary to make the material conform to the carrying surface of the belt, thus contact with the treated surface of the material by means other than the pneumatic pressure is eliminated.

As noted above in regard to Figs. 9 and 10 and as shown in said figures and in Figs. 11 and 12, the perforated walls 24 of the high pressure chamber may be eliminated and the belts or the material and the belt together form the dividing partition between the high pressure at one side of the belt and the lower pressure at the opposite side of the belt, and in Figs. 13 and 14 the whole lower portion of the casing is omitted and the belt 10d forms the bottom of the pressure casing.

I claim:

1. The combination of a conveyer belt arranged to carry material loosely on the upper face thereof, means engaging said belt adjacent its oppositely disposed side edges only for guiding the belt through a vertically undulated course, means for driving the conveyer belt longitudinally in its own plane continuously through all of the undulations of said course and means for creating a predetermined pneumatic pressure on the upper face and a relatively lower pneumatic pressure on the reverse face of the belt to hold the material on the said carrying face while the belt is moved through said undulated course.

2. The combination of a conveyer belt arranged to carry material loosely on the upper face thereof, means engaging the belt adjacent the side edges only thereof for guiding said conveyer belt in a vertically undulated course, means for driving the conveyer belt longitudinally in its own plane continuously throughout all the undulations of said course, and means for impinging jets of air against the upper face of the belt and the material carried thereby to hold material to the said face of the conveyer belt.

3. The combination of a conveyer belt comprising laterally spaced side chains, a series of bars extending transversely of the belt in relatively close laterally spaced relation to each other and attached at their opposite ends to said chains respectively providing a supporting face for the material to be conveyed, means for guiding the side chains in corresponding vertically undulated courses, means for driving the side chains longitudinally and continuously through all the undulations of said courses and means for forcing air through the belt from the upper face toward the reverse face thereof for holding the material yieldingly on the said carrying face thereof.

4. The combination of a casing, a belt conveyer arranged to travel through the casing in a vertically undulated path and to carry material loosely on its upper face therewith, said conveyer comprising laterally spaced side chains and an intermediate body portion connected at its opposite ends to said side chains respectively said body portion comprising relatively narrow material-engaging surfaces spaced laterally and relatively close over the area of said body portion, means engaged by said side chains for guiding the conveyer through said undulated path, a suitably walled air chamber in the casing adjacent the crests of said undulations and having extensions projecting into the troughs between said undulations, means for driving air into the chamber and its extensions with predetermined portions of the walls of the chamber and its extensions being perforated to direct the air against the face of the belt and the material carried thereon for holding the material to the face of the belt.

5. The combination of a casing, a belt conveyer arranged to travel through the casing in a vertically undulated path and to carry material loosely on its upper face therewith, said conveyer comprising laterally spaced side chains and an intermediate body portion connected at its opposite ends to said side chains respectively said body portion comprising relatively narrow material-engaging surfaces spaced laterally and relatively close over the area of said body portion, means engaged by said side chains for guiding the conveyer through said undulated path, an air chamber in the top of the casing and comprising a bottom wall adjacent the crests of the undulations of the belt, extensions of the air chamber projecting downwardly from the bottom wall of said air chamber between the said undulations and comprising perforated walls disposed substantially parallel to and spaced from the undulated portions of the belt respectively, and means for driving air into the air chamber and its extensions and through the said perforated walls of said extensions against the carrying face of the belt and the material thereon for holding the material to the face of the belt.

6. The combination of a casing including a top and side walls, a belt conveyer arranged to travel through the casing in an undulated path and to carry material on one of its faces therewith, an air chamber in the top of the casing and comprising a bottom wall adjacent the crests of the undulations of the belt and side walls extending from the said bottom wall of the chamber to the top wall of the casing and spaced inwardly from the said side walls of the casing respectively, extensions of the air chamber projecting downwardly from the bottom wall of said air chamber between the said undulations and comprising perforated walls disposed substantially parallel to and spaced from the undulated portions of the belt respectively and imperforate side walls spaced inwardly from the side walls of the casing respectively, a lower air chamber below the undulated belt, side chambers communicating with said lower chamber, and air circulating means arranged in the side walls of the upper air chamber for drawing air from the lower air chamber through said side chamber and driving said air into the upper chamber and its depending extension and through the perforated walls of the latter against the carrying face of the belt and the material thereon.

7. The combination of a casing including a top and side walls, a belt conveyer arranged to travel through the casing in an undulated path and to carry material on one of its faces therewith, an air chamber in the top of the casing and comprising a bottom wall adjacent the crests of the undulations of the belt and side walls extending from the said bottom wall of the chamber to the top wall of the casing and spaced inwardly from the said side walls of the casing respectively, extensions of the air chamber projecting downwardly from the bottom wall of said air chamber between the said undulations and comprising perforated walls disposed substantially parallel to and spaced from the undulated portions of the belt respectively and imperforate side walls spaced inwardly from the side walls of the casing respectively, a lower air chamber below the undulated belt, side chambers communicating with said lower chamber, air circulating means arranged in the side walls of the upper air chamber for drawing air from the lower air chamber through said side chamber and driving said air into the upper chamber and its depending extension and through the perforated walls of the latter against the carrying face of the belt and the material thereon, and means for heating the air in circulation.

8. The combination of a casing including a top and side walls, a belt conveyer arranged to travel through the casing in an undulated path and to carry material on one of its faces therewith, an air chamber in the top of the casing and comprising a perforated bottom wall adjacent the crests of the undulations of the belt and side walls extending from the said bottom wall of the chamber to the top wall of the casing and spaced inwardly from the said side walls of the casing respectively, extensions of the air chamber projecting downwardly from the bottom wall of said air chamber between the said undulations and comprising perforated walls disposed substantially parallel to and spaced from the undulated portions of the belt respectively and imperforate side walls spaced inwardly from the side walls of the casing respectively, a lower air chamber below the undulated belt, side chambers communicating with said lower chamber, air circulating means arranged in the side walls of the upper air chamber for drawing air from the lower air chamber through said side chamber and driving said air into the upper chamber and its depending extension and through the perforated walls thereof against the carrying face of the belt and the material thereon, and means for conditioning the air in circulation.

9. The combination of a casing including a top and side walls, a belt conveyer arranged to travel through the casing in an undulated path and to carry material on one of its faces therewith, an air chamber in the top of the casing and comprising a perforated bottom wall adjacent the crests of the undulations of the belt and side walls extending from the said bottom wall of the chamber to the top wall of the casing and spaced inwardly from the said sidewalls of the casing respectively, extensions of the air chamber projecting downwardly from the bottom wall of said air chamber between the said undulations and comprising perforated walls disposed substantially parallel to and spaced from the undulated portions of the belt respectively and imperforate side walls spaced inwardly from the side walls of the casing respectively, a lower air chamber below the undulated belt, side chambers communicating with said lower chamber, air circulating means arranged in the side walls of the upper air chamber for drawing air from the lower air chamber through said side chamber and driving said air into the upper chamber and its depending extension and through the perforated walls thereof against the carrying face of the belt and the material thereon, means for heating the air in circulation, and a baffle extending longitudinally through the upper air chamber and arranged to direct the air from said circulating means downwardly into the extensions of said upper air chamber.

10. The combination of a conveyor belt arranged to travel in a vertically undulated path and to carry material loosely on the upper face thereof, said conveyer comprising laterally spaced side chains and an intermediate body portion connected at its opposite ends to said side chains respectively said body portion comprising relatively narrow material-engaging surfaces spaced laterally and relatively close over the area of said body portion, means engaged by said side chains for guiding the conveyer through said undulated path, an air chamber disposed above the crests of said undulations and comprising a perforated bottom wall adjacent said crests and imperforate side and top walls, extensions depending from the bottom wall into the troughs between the undulations, said extensions including perforated walls disposed adjacent and substantially parallel to the undulations of the belt with the perforations extending substantially perpendicular to the belt and imperforate side walls closing the extensions intermediate the said perforated walls thereof, and means for driving air into the said air chamber and its extensions and through the perforated walls thereof against the upper face of the belt and the material thereon.

11. The combination of a conveyer belt arranged to travel in a vertically undulated path and to carry material loosely on the upper face thereof, said conveyer comprising laterally spaced side chains and an intermediate body portion connected at its opposite ends to said side chains respectively said body portion comprising relatively narrow material-engaging surfaces spaced laterally and relatively close over the area of said body portion, means engaged by said side chains for guiding the conveyer through said undulated path, an air chamber disposed above the crests of said undulations and comprising a perforated bottom wall adjacent said crests and imperforate side end and top walls, extensions depending from the bottom wall into the troughs between the undulations, said extensions including perforated walls disposed adjacent and substantially parallel to the undulations of the belt with the perforations extending substantially perpendicular to the belt and imperforate side walls closing the extensions intermediate the said perforated walls thereof, means in one of the imperforate walls of the air chamber for driving air into the said air chamber and its extensions and through the perforated walls thereof against the upper face of the belt and the material thereon, and inclined baffles within the air chamber for directing the air downward into the depending extensions thereof.

12. The combination of a conveyer belt arranged to travel in an undulated path and to carry material loosely on the upper face thereof, said conveyer comprising laterally spaced side chains and an intermediate body portion connected at its opposite ends to said side chains respectively said body portion comprising relatively narrow material-engaging surfaces spaced laterally and relatively close over the area of said body portion, means engaged by said side chains for guiding the conveyer through said undulated path, an air chamber disposed above the crests of said undulations and comprising a perforated bottom wall adjacent said crests and imperforate side and top walls, extensions depending from the bottom wall into the troughs between the undulations, said extensions including perforated walls disposed adjacent and substantially parallel to the undulations of the belt with the perforations extending substantially perpendicular to the belt and imperforate side walls closing the extensions intermediate the said perforated walls thereof, means in the side walls of said air chamber for driving air into and transversely of the air chamber, and a pair of relatively inclined baffles extending longitudinally of the air chamber for directing the air vertically downward into the depending projections of the chamber.

ALPHEUS O. HURXTHAL.